United States Patent
Hodge et al.

(10) Patent No.: US 11,076,179 B2
(45) Date of Patent: Jul. 27, 2021

(54) VIEWERSHIP-BALANCED VIDEO MULTIPLEXING

(71) Applicant: DISH Technologies L.L.C., Englewood, CO (US)

(72) Inventors: Kenneth Robert Hodge, Castle Rock, CO (US); Anand Shivashankara Menon, Lone Tree, CO (US)

(73) Assignee: DISH Technologies L.L.C., Englewood, CO (US)

( * ) Notice: Subject to any disclaimer, the term of this patent is extended or adjusted under 35 U.S.C. 154(b) by 7 days.

(21) Appl. No.: 15/621,790

(22) Filed: Jun. 13, 2017

(65) Prior Publication Data

US 2018/0359506 A1    Dec. 13, 2018

(51) Int. Cl.
    *H04N 21/2365*     (2011.01)
    *H04L 29/06*     (2006.01)
    (Continued)

(52) U.S. Cl.
    CPC ..... *H04N 21/23655* (2013.01); *H04L 65/607* (2013.01); *H04L 65/80* (2013.01);
    (Continued)

(58) Field of Classification Search
    CPC ......... H04N 21/2365; H04N 21/23655; H04N 21/2402; H04N 21/2407; H04N 21/2408;
    (Continued)

(56) References Cited

U.S. PATENT DOCUMENTS

| | | |
|---|---|---|
| 5,771,234 A | 6/1998 | Wu et al. |
| 6,721,957 B1 | 4/2004 | Lawrence |

(Continued)

FOREIGN PATENT DOCUMENTS

| | | |
|---|---|---|
| EP | 2 175 651 A1 | 4/2010 |
| JP | H11 177945 A | 7/1999 |

(Continued)

OTHER PUBLICATIONS

International Search Report and Written Opinion for PCT/US2018/035964 dated Jul. 25, 2018, all pages.

(Continued)

*Primary Examiner* — Jeremy S Duffield
(74) *Attorney, Agent, or Firm* — Kilpatrick Townsend & Stockton LLP

(57) ABSTRACT

Systems, methods, and processor-readable media are provided for content distribution for a multi-channel content distribution system. A content item may be received by a video handling system. The content item may include video data, the content item corresponding to media for delivery to a television receivers via channel components. A metric of the content item may be detected as a function of time. Viewership data received from data sources may be processed, the viewership data indicative of one or more characteristics of viewers. The viewership data may be mapped to the content item. The content item may be qualified based on the viewership data to yield a qualification result for the content item. An encoding parameter to encode the content item may be determined based on the metric and the qualification result. Encoding of the content item may be specified in accordance with the encoding parameter.

20 Claims, 4 Drawing Sheets

(51) Int. Cl.
*H04N 21/24* (2011.01)
*H04N 21/61* (2011.01)
*H04N 21/2662* (2011.01)
*H04N 21/658* (2011.01)
*H04N 21/442* (2011.01)

(52) U.S. Cl.
CPC ..... *H04N 21/2402* (2013.01); *H04N 21/2407* (2013.01); *H04N 21/2662* (2013.01); *H04N 21/6143* (2013.01); *H04N 21/44222* (2013.01); *H04N 21/6582* (2013.01)

(58) Field of Classification Search
CPC ............... H04N 21/258; H04N 21/262; H04N 21/26208; H04N 21/26216; H04N 21/2662; H04N 21/6143
See application file for complete search history.

(56) References Cited

U.S. PATENT DOCUMENTS

| | | | |
|---|---|---|---|
| 6,868,452 B1 | 3/2005 | Eager et al. | |
| 8,635,653 B2 | 1/2014 | Carmichael | |
| 9,071,484 B1* | 6/2015 | Truax | H04N 21/4331 |
| 2003/0220072 A1 | 11/2003 | Coffin, III | |
| 2006/0222078 A1* | 10/2006 | Raveendran | H04N 21/2365 |
| | | | 375/240.16 |
| 2008/0163311 A1 | 7/2008 | St. John-Larkin | |
| 2009/0031384 A1* | 1/2009 | Brooks | H04N 21/23439 |
| | | | 725/127 |
| 2009/0165057 A1 | 6/2009 | Miller et al. | |
| 2010/0199301 A1 | 8/2010 | Hayashi et al. | |
| 2010/0262999 A1 | 10/2010 | Curran | |
| 2010/0299552 A1* | 11/2010 | Schlack | H04L 47/25 |
| | | | 714/4.1 |
| 2012/0110167 A1 | 5/2012 | Joch et al. | |
| 2012/0113320 A1 | 5/2012 | Platzer | |
| 2012/0278843 A1* | 11/2012 | Carmichael | H04H 20/33 |
| | | | 725/67 |
| 2013/0121261 A1* | 5/2013 | Yao | H04W 72/0453 |
| | | | 370/329 |
| 2014/0189754 A1 | 7/2014 | Major et al. | |
| 2014/0369403 A1 | 12/2014 | Nagayama | |
| 2016/0105711 A1 | 4/2016 | Martch et al. | |
| 2017/0048558 A1* | 2/2017 | Koupsin | H04N 21/2402 |
| 2017/0099227 A1* | 4/2017 | Slater | H04L 65/605 |
| 2017/0353744 A1* | 12/2017 | Kunisetty | H04N 21/23109 |
| 2018/0184146 A1* | 6/2018 | Pichon | H04N 21/6125 |
| 2018/0205778 A1* | 7/2018 | Forman | H04L 47/822 |

FOREIGN PATENT DOCUMENTS

| | | |
|---|---|---|
| WO | 2004/025405 A2 | 3/2004 |
| WO | 2010/145807 A2 | 12/2010 |

OTHER PUBLICATIONS

International Preliminary Report on Patentability for PCT/US2018/035964 dated Dec. 17, 2019, all pages.

* cited by examiner

VIEWERSHIP-BALANCED VIDEO MULTIPLEXING

This disclosure generally relates to systems and methods of media content distribution, and more particularly to systems and methods for facilitating media content distribution for a multi-channel content distribution system based at least in part on viewership-balanced video multiplexing.

BACKGROUND

As use, access, and demand corresponding to televisions and other video distribution platforms continue to increase, television viewers have come to expect that their television receivers, companies are expected to compete to provide more and more content at better and better quality. To that end, service providers may encode content items using a variable bit rate, because, for certain types of content items such as a television program, the amount of data that needs to be encoded varies over time since the amount of data required between video frames fluctuates over time. However, with the proliferation of content, service providers can encounter a number of difficulties. Chief among the difficulties is limited throughput of a transport channel and under-utilization of a transport channel or a component of a transport channel.

Thus, there is a need for systems and methods that address the foregoing problems. This and other needs are addressed by the present disclosure.

BRIEF SUMMARY

Various embodiments of the present disclosure relate generally to systems and methods of media content distribution, and more particularly to systems and methods for facilitating media content distribution for a multi-channel content distribution system based at least in part on viewership-balanced video multiplexing.

In one aspect, a method media content distribution for a multi-channel content distribution system is disclosed. The method may include performing one or a combination of the following. A content item may be received by a video handling system. The content item may include video data, the content item corresponding to media for delivery to a plurality of television receivers via a set of one or more channel components. At least one metric of the content item may be detected, by the video handling system, as a function of time. Viewership data received from one or more data sources remote from the video handling system may be processed by the video handling system, the viewership data indicative of one or more characteristics of viewers. The viewership data may be mapped, by the video handling system, to the content item. The content item may be qualified, by the video handling system, based at least in part on the viewership data, the qualifying to yield a qualification result for the content item. At least one encoding parameter to encode the content item may be determined, by the video handling system, based at least in part on the at least one metric of the content item and the qualification result for the content item. Encoding of the content item may be specified, by the video handling system, in accordance with the at least one encoding parameter.

In another aspect, a system for multi-channel media content distribution is disclosed. The system may include a load-balancing encoding controller communicatively coupled to an encoding pool of encoders. The load-balancing encoding controller may be configured to perform one or a combination of the following. A content item may be received. The content item may include video data, the content item corresponding to media for delivery to a plurality of television receivers via a set of one or more channel components. At least one metric of the content item may be detected as a function of time. Viewership data received from one or more data sources remote from the system may be processed, the viewership data indicative of one or more characteristics of viewers. The viewership data may be mapped to the content item. The content item may be qualified based at least in part on the viewership data, the qualifying to yield a qualification result for the content item. At least one encoding parameter to encode the content item may be determined based at least in part on the at least one metric of the content item and the qualification result for the content item. Encoding of the content item may be specified in accordance with the at least one encoding parameter.

In yet another aspect, one or more non-transitory, processor-readable media are disclosed. The one or more non-transitory, processor-readable media may have instructions thereon which, when executed by one or more processing devices, cause the one or more processing devices to perform one or a combination of the following. A content item may be received. The content item may include video data, the content item corresponding to media for delivery to a plurality of television receivers via a set of one or more channel components. At least one metric of the content item may be detected as a function of time. Viewership data received from one or more data sources remote from the system may be processed, the viewership data indicative of one or more characteristics of viewers. The viewership data may be mapped to the content item. The content item may be qualified based at least in part on the viewership data, the qualifying to yield a qualification result for the content item. At least one encoding parameter to encode the content item may be determined based at least in part on the at least one metric of the content item and the qualification result for the content item. Encoding of the content item may be specified in accordance with the at least one encoding parameter.

In various embodiments, a bandwidth metric of at least one channel component of the set of one or more channel components for delivery of the media may be calculated. And the determining the at least one encoding parameter may be further based at least in part on the at least one channel component. In various embodiments, the at least one metric of the content item may include a bit rate of the content item. In various embodiments, the at least one metric of the content item further may include a time scheduled for the content item. In various embodiments, the one or more data sources may include a set of television receivers. In various embodiments, the processing the viewership data may include compiling and analyzing viewing and recording statistics of the viewers. In various embodiments, the set of one or more channel components corresponds to a set of one or more satellite transponders.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Various embodiments will now be discussed in greater detail with reference to the accompanying figures, beginning with FIG. 1.

Figure 1:
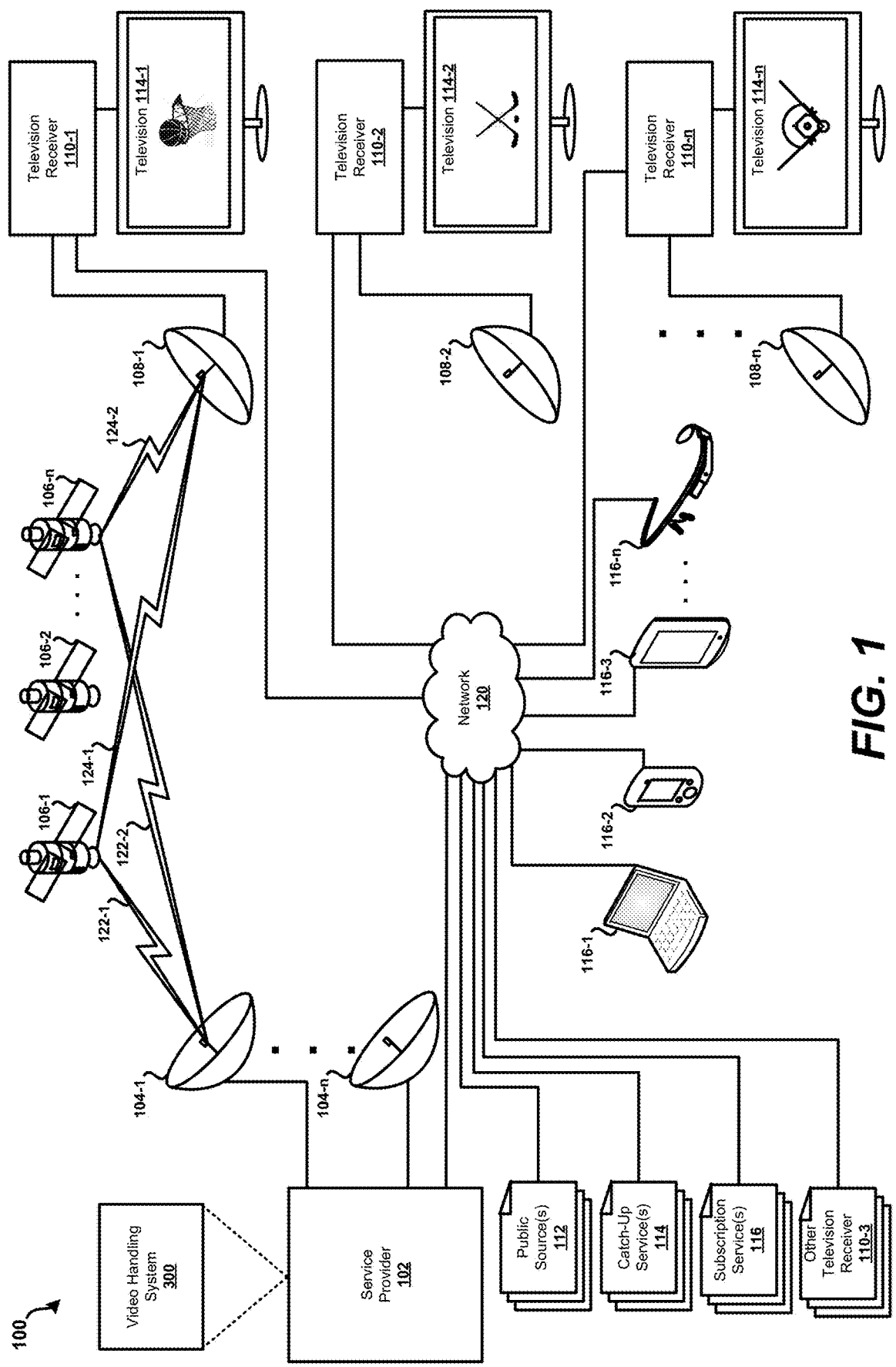
FIG. 1 illustrates an example television content distribution system, in accordance with various embodiments of the present disclosure.

FIG. 1 illustrates an example television content distribution system 100, in accordance with various embodiments of the present disclosure. For brevity, the television content distribution system 100 is depicted in a simplified and conceptual form, and may generally include more or fewer systems, devices, networks, and/or other components as desired. Further, the number and types of features or elements incorporated within the television content distribution system 100 may or may not be implementation-specific, and at least some of the aspects of the television content distribution system 100 may be similar to a cable television distribution system, an IPTV (Internet Protocol Television) content distribution system, and/or any other type of content distribution system. While various embodiments and examples provided below are specific to a satellite-based distribution system, it should be understood that various aspects of this disclosure may apply to any multi-channel distribution system using statistical multiplexing of video services over a fixed bandwidth. For example, aspects of this disclosure may apply to QAM (quadrature amplitude modulation) cable systems, ATSC (Advanced Television Systems Committee) 8VSB modulated OTA (over-the-air) signals, and/or the like.

The television content distribution system 100 may include a television service provider system 102, one or more satellite uplinks 104, one or more orbiting (e.g., geosynchronous) satellites 106, one or more satellite dishes 108, one or more television receivers 110, one or more display devices 114, and one or more computing devices 116. In various embodiments, the television service provider system 102 may include a video handling system 300, disclosed further herein. The service provider system 102 and satellite transmitter equipment (which may include the one or more satellite uplinks 104) may be operated by a television service provider. A television service provider may distribute television channels, on-demand programming, programming information, and/or other services to users via satellite. The television service provider system 102 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites in the form of transponder streams. Satellite transmitter equipment may be used to transmit a feed of one or more television channels from the television service provider system 102 to one or more satellites 106. While a single television service provider system 102 is illustrated as part of the television distribution system 100, it should be understood that multiple instances of transmitter equipment may be used, possibly scattered geographically to communicate with satellites 106. Such multiple instances of satellite transmitting equipment may communicate with the same or with different satellites 106.

The system 100 may include one or more networks 120 that can be used for a bi-directional communication path for data transfer with the television receivers 110 and/or other components of system 100. The network 120 is intended to represent any number of terrestrial and/or non-terrestrial networks and/or network features. For example, the network 120 may incorporate or exhibit any number of features or elements of various wireless and/or hardwired packet-based communication networks such as, for example, a WAN (Wide Area Network) network (e.g., the Internet), a HAN (Home Area Network) network, a LAN (Local Area Network) network (e.g., a corporate LAN), a WLAN (Wireless Local Area Network) network, a cellular communications network, and/or any other type of communication network(s) configured such that data may be transferred between and among respective elements of the example system 100.

The television receivers 110, as described throughout, may generally be any type of television receiver (such as a set-top box (STB), for example) configured to decode signals received for output and presentation via a display device 114. In another example, television receiver 110 may be integrated as part of or into a television, a DVR, a computing device, such as a tablet computing device, or any other computing system or device, as well as variations thereof. In various embodiments, a television receiver 110 may be a component that is added into the display device 114, such as in the form of an expansion card. In various embodiments, the network 120 together with one or more television receivers 110 and/or one or more computing devices 116 may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc. While only a limited number of television receivers 110, display devices 114, computing devices 116, etc. are illustrated in FIG. 1, it should be understood that multiple (e.g., tens, thousands, millions) instances of such equipment, corresponding to various users in various geo-locations, may be included the system 100.

In various embodiments, broadcast television programs may be delivered to the television receivers 110 via satellite according to a schedule. On-demand content may also be delivered to the television receivers 110 via satellite. The satellites 106 may be configured to receive uplink signals 122 from one or more of the satellite uplinks 104. In this example, uplink signals 122 may contain one or more transponder streams of particular data or content, such as particular television channels, each of which may be supplied by service provider system 102. For example, each of uplink signals 122 may contain various media content such as HD (High Definition) television channels, SD (Standard Definition) television channels, on-demand programming, programming information (e.g., table data), and/or any other content in the form of at least one transponder stream, and in accordance with an allotted carrier frequency and bandwidth. In this example, different media content may be carried using different satellites of satellites 106. Further, different media content may be carried using different transponders of a particular satellite (e.g., satellite 106-1); thus, such media content may be transmitted at different frequencies and/or different frequency ranges. For example, a first television channel and a second television channel may be carried on a first carrier frequency over a first transponder (as part of a single transponder stream) of satellite 106-1, and a third, fourth, and fifth television channel may be carried on a second carrier frequency (as part of another transponder stream) over a transponder of satellite 106-3, or, the third, fourth, and fifth television channel may be carried on a second carrier frequency over a second transponder of satellite 106-1, etc.

The satellites 106 may further be configured to relay the uplink signals 122 to a given satellite dish 108 as downlink signals 124. Similar to the uplink signals 122, each of the downlink signals 124 may contain one or more transponder streams of particular data or content, such as various encoded and/or at least partially electronically scrambled television channels, on-demand programming, etc., in accordance with an allotted carrier frequency and bandwidth. The downlink signals 124, however, may not necessarily contain the same or similar content as a corresponding one of the uplink signals 122. For example, the uplink signal 122-1 may include a first transponder stream containing at least a first group or grouping of television channels, and the downlink signal 124-1 may include a second transponder stream containing at least a second, different group or grouping of television channels. In other examples, the first and second group of television channels may have one or more television channels in common. In sum, there may be varying degrees of correlation between the uplink signals 122 and the downlink signals 124, both in terms of content and underlying characteristics. However, in some implementations, the downlink signals 124 may mirror the uplink signals 122.

In some scenarios, a given satellite dish 108 may be provided for use to receive television channels (e.g., on a subscription basis) provided by the service provider system 102, one or more satellite uplinks 104, and one or more satellites 106. For example, a given satellite dish 108 may be configured to receive particular transponder streams, or downlink signals 124, from one or more of the satellites 106. Based at least in part on the characteristics of a particular television receiver 110 and/or satellite dish 108, however, it may only be possible to capture transponder streams from a limited number of transponders concurrently. For example, a tuner of the television receiver 110 may be configured to tune to a single transponder stream from a transponder of a single satellite at a time.

Additionally, the television receiver 110, which is communicatively coupled to the satellite dish 108, may subsequently select via tuner, decode, and relay particular transponder streams to the display device 114 for display thereon. For example, the satellite dish 108 and the television receiver 110, respectively, may be configured to receive, decode, and relay at least one premium HD-formatted television channel to the display device 114. Programming or content associated with the HD channel may generally be presented live, or from a recording as previously stored on, by, or at the television receiver 110. In this example, the HD channel may be output to the display device 114 in accordance with the HDMI/HDCP content protection technologies. Other embodiments are possible.

In some instances, the television receiver 110 may select via tuner, decode, and relay particular transponder streams to one or more other television receivers 110, which may in turn relay particular transponder streams to one or more other display devices 114. For example, the satellite receiver 108-1 and the television receiver 110-1 may, respectively, be configured to receive, decode, and relay at least one television channel to a television 114-2 by way of a television receiver 110-2. Similar to the above example, a television channel may generally be presented "live," or from a recording as previously stored by the television receiver 110, and may be output to the display device 114-2 by way of the television receiver 110-1 in accordance with a particular content protection technology and/or networking standard. Other embodiments are possible.

Still further, the satellite dish 108 and the television receiver 110 may, respectively, be configured to receive, decode, and relay at least one premium television channel to one or more of the computing devices 116. Similar to the above examples, the television channel may generally be presented live, or from a recording as previously stored on the television receiver 110, and may be output to one or more of the computing devices 116 in accordance with a particular content protection technology and/or networking standard.

The service provider system 102, which may distribute broadcast television programming to the television receivers 110 via a satellite-based television programming distribution arrangement (or some other form of television programming distribution arrangement, such as a cable-based network or IP-based network, may use an alternate communication path, such as via the network 120, to provide television programming to the television receivers 110. The television receivers 110 may be permitted to request various television programs or portions of television programs from the service provider system 102 via the network 120. For instance, the service provider system 102 may be permitted to transmit a portion of a television program or an entire television program during and/or after a time at which the television program was broadcast live by the television service provider via a satellite-based television programming distribution arrangement.

In various embodiments, the service provider system 102 may provide a television program via on-demand content. On-demand content may be included in a user's subscription or may be provided on a per-request basis. Such on-demand content may be provided via the satellite-based distribution arrangement and/or via the network 120. If the on-demand version of the television program requires payment of a fee, before providing the television program to the television receiver 110, a user of the television receiver 110 may at least need to agree to payment of the fee. On-demand content provided via the satellite-based distribution arrangement may be stored locally by the television receiver 110 to allow on-demand access. On-demand content may also be retrieved via the network 120 from the service provider system 102.

The computing devices 116 represent various computerized devices that may be associated with a user of the television receiver 110 and that may be configured to facilitate various content discovery features disclosed in various embodiments herein. As indicated by 116a, the computing devices 116 may include a laptop computer, a desktop computer, a home server, or another similar form of computerized device. As indicated, the computing devices 116 may include a cellular phone and/or smartphone, a tablet computer, or another similar form of mobile device. Also as indicated, the computing devices 116a-d may include smart glasses or another similar form of wearable computing device.

The television receiver 110 may be provided with access credentials that allow access to content stored and/or accessible through one or more of the computing devices 116. It should be understood that computing devices 116 are exemplary in nature. Content may be accessible through a fewer or greater number of computerized devices associated with a user of the television receiver 110.

In various embodiments, the television receiver 110 may be provided with access to one or more public sources 112, one or more catch-up services 114, one or more subscription services 116, and/or one or more (other) television receivers 110-3. Such access may be generally referenced herein as sources for alternative viewing options, in addition to the service provider 102 being a source for alternative viewing options. As disclosed further herein, alternative viewing options may be provided to television receivers 110 when content items are dynamically adjusted, such that quality of the content items is decreased (e.g., encoding bit rates are decreased) and/or content items are not transmitted, based at least in part on transponder bandwidth.

Public sources 112 represent content resources through which television programs may be retrieved by a television receiver 110 via network 120. Television programming available through public sources 112 may be available for free and not require subscription (a username and/or password may or may not be necessary). Each of public sources 112 may represent different websites available via the Internet. For example, some television programming may be legally made available for free (such as television programming provided by government-funded sources, e.g., the BBC or Hulu®). Periodically, a television receiver 110 may poll public sources 112 to determine which television programs are available and/or which television programs are scheduled to be available in the future. In various embodiments, a television receiver 110 may poll public sources 112 regarding the availability of at least a portion of a specific television program. While a number of examples of public sources 112 are illustrated, it should be understood that a television receiver 110 may have access to more or fewer public sources 112.

Catch-up services 114 represent content resources through which television programs may be retrieved by a television receiver 110 via network 120. Television programming available through public sources 112 may be available for free and not require subscription (a username and/or password may or may not be necessary). Some catch-up services may require a subscription and may require user authentication. Catch-up services 114 may only make a television program available during the live broadcast of the television program. For example, a catch-up service authorized or run by a television channel (e.g., NBC) or television program production company may make at least a portion of a television program available for streaming or download during a live broadcast scheduled time slot. Therefore, a user may be permitted to watch a missed portion of a live broadcast television program via a catch-up service, but may not be permitted to view the entire television program via the catch-up service at a later time. In various embodiments, television programs may be available via a catch-up service for up to a fixed period of time after the live broadcast of the television program or indefinitely (e.g., until the catch-up service provider decides to remove accessibility to the television program). Periodically, a television receiver 110 may poll catch-up services 114 to determine which television programs are available and/or which television programs are scheduled to be available in the future. In various embodiments, a television receiver 110 may poll catch-up services 114 regarding the availability of at least a portion of a specific television program. While two examples of catch-up services 114 are illustrated, it should be understood that television receivers 110 may have access to more or fewer catch-up services 114.

Subscription services 116 represent content resources through which television programs may be retrieved by television receivers 110 via network 120. Television programming available through subscription services 116 may require a paid subscription and may require a username and/or password be provided. Each of subscription services 116 may represent different websites available via the Internet. For example, some television programming may be legally made available via a service operated by a television channel or authorized agent of the television channel or television program production company. Periodically, a television receiver 110 may poll subscription services 116 to determine which television programs are available and/or which television programs are scheduled to be available in the future. In various embodiments, a television receiver 110 may poll subscription services 116 regarding the availability of at least a portion of a specific television program. While two examples of subscription services 116 are illustrated, it should be understood that television receiver 110 may have access to more or fewer subscription services 116.

Figure 2:
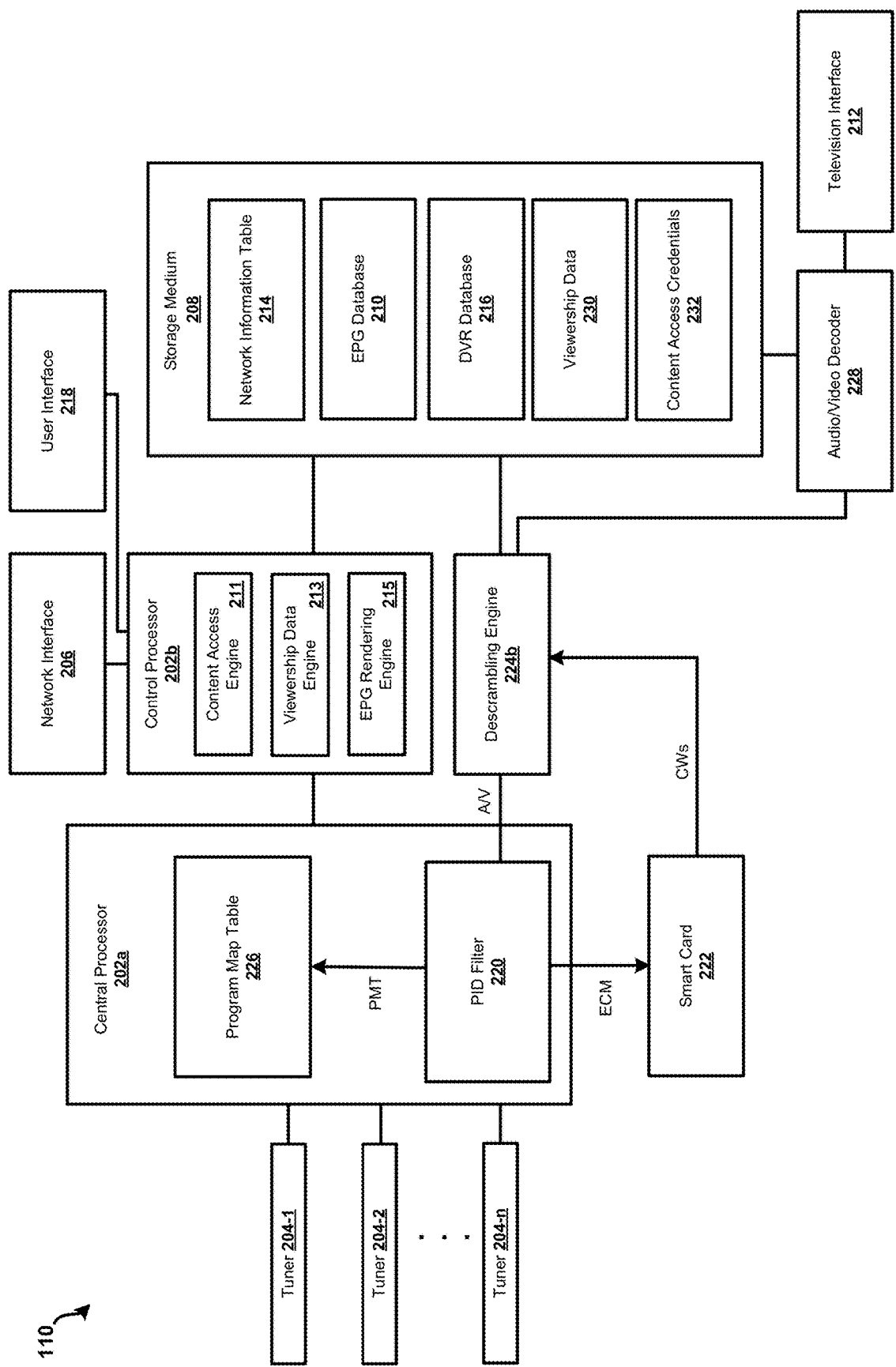
FIG. 2 illustrates an example block diagram of the television receiver, in accordance with various embodiments of the present disclosure.

Referring now to FIG. 2, an example block diagram of the television receiver 110 of FIG. 1 is shown in accordance with various embodiments of the present disclosure. In various embodiments, at least one of the other television receivers 110-$n$ may be configured to exhibit a reduced functionality as compared to the television receiver 110-1, and may depend at least to a certain degree on the television receiver 110-1 to implement certain features or functionality so that the television receiver 110-$n$ may be referenced as a "thin client." However, other embodiments may not implement such thin clients.

The television receiver 110 may include at least one processor 202, including a central processor 202$a$ and a control processor 202$b$, a plurality of tuners 204, at least one network interface 206, at least one non-transitory computer-readable storage medium 208, at least one EPG database 210, at least one television interface 212, at least one NIT (Networking Information Table) 214, at least one DVR database 216, at least one user interface 218, at least one PID filter 220, at least one smart card 222, at least one descrambling engine 224, at least one PMT (Program Map Table) 226, and at least one decoder 228. In other embodiments of the television receiver 110, fewer or greater numbers of components may be present. Further, functionality of one or more components may be combined in various embodiments. For example, functions of the descrambling engine 224 may be performed by the central processor 202$a$ in various embodiments. Still further, functionality of components may be distributed among additional components, and possibly additional systems, for example, in a cloud-computing type implementation.

The processor 202 may include one or more specialized and/or general-purpose processors configured to perform processes such as tuning to a particular channel, accessing and displaying EPG information from the EPG database 210, and/or receiving and processing input from a user. For example, processor 202 may include one or more processors dedicated to decoding video signals from a particular format, such as MPEG, for output and display on a television and for performing or at least facilitating decryption or descrambling.

The control processor 202$b$ may communicate with the central processor 202$a$. The control processor 202$b$ may control the recording of television channels based at least in part on timers stored in the DVR database 216. The control processor 202$b$ may initiate recording of a television channel by sending a record command along with an indication of the television channel to be recorded to the central processor 202$a$. The control processor 202$b$ may not send a second record command, when additional recording is to begin at the same time, until an acknowledgement that recording of the first television channel has successfully been received and initiated by the central processor 202$a$. The control processor 202$b$ may also provide commands to the central processor 202$a$ when recording of a television channel is to cease. In addition to providing commands relating to the recording of television channels, the control processor 202$b$ may provide commands to the central processor 202$a$ that indicate television channels to be output to the decoder 228 for output to a presentation device, such as the television 114$c$ for example.

The control processor 202$b$ may also communicate with the network interface 206 and the user interface 218. The control processor 202$b$ may handle incoming data from the network interface 206 and the user interface 218. Additionally, the control processor 202$b$ may be configured to output data via the network interface 206. Additionally, the control processor 202$b$ may be configured to instantiate and/or implement the configuration module 126 mentioned above. Other embodiments are possible. For example, such functionality may be wholly or at least partially implemented by the central processor 202$a$.

The tuners 204 may be used to tune to television channels, such as television channels transmitted via satellite or cable, such as satellites 106. Each respective one of the tuners 204 may be capable of receiving and processing a single stream of data from a satellite transponder, or a cable channel, at a given time. As such, a single tuner may tune to a single transponder or, for a cable network, a single cable channel. Additionally, one tuner (e.g., tuner 204-1) may be used to tune to a television channel on a first transponder stream for display using a television, while another tuner (e.g., tuner 204-2) may be used to tune to a television channel on a second transponder for recording and viewing at some other time. Still another tuner (e.g., tuner 204-$n$) may be used to check various television channels to determine if they are available or not. If multiple television channels transmitted on the same transponder stream are desired, a particular tuner (e.g., tuner 204-1) may be used to receive the signal containing the multiple television channels for presentation and/or recording. The tuners 204 may receive commands from the central processor 202$a$ and/or control processor 202$b$. Such commands may instruct the tuners 204 which frequencies are to be used for tuning. Various embodiments of the television receiver 110 may include various numbers of tuners (e.g., 6 tuner, 8 tuners, 24 tuners, etc.), and the features or aspects of the present disclosure may be implemented similarly, and scale according to number of tuners of the television receiver 110.

The network interface 206 may be used to communicate via an alternate communication channel with a television service provider. For example, the primary communication channel between the television service provider and the television receiver 110 may be via satellite, which may be unidirectional to the STB, and an another communication channel between the television service provider and the television receiver 110, which may be bidirectional, may be via a network, such as the Internet. The television receiver 110 may be able to communicate with the service provider system 102 of FIG. 1 via network 120. This communication may be bi-directional. For example, data may be transmitted from the television receiver 110 to the service provider 102, and from the service provider 102 to the television receiver 110. The network interface 206 may be configured to communicate via one or more networks, such as the Internet, to communicate with the service provider 102. Viewership data and user feedback may be transmitted and/or received via the network interface 206. Additionally, network interface 206 may be used to retrieve at least portions of television programs from public sources 112, catch-up services 114, subscription services 116, other television receivers 110-3, and/or computing devices 116.

The storage medium 208 may represent a non-transitory computer-readable storage medium. The storage medium 208 may include memory and/or a hard drive. The storage medium 208 may be used to store information received from one or more satellites and/or information received via the network interface 206. The storage medium 208 may store information related to the EPG database 210, the NIT 214, and/or the DVR database 216, among other elements or features, such as the configuration profile 128 mentioned above. Recorded television programs may be stored using the storage medium 208. The storage medium 208 may be partitioned or otherwise divided such that predefined amounts of the storage medium 208 are devoted to storage of omnibus channel files and user-selected television programs.

The EPG database 210 may store information related to television channels and the timing of programs appearing on such television channels. The EPG database 210 may be stored using the storage medium 208, which may be a hard drive. Information from the EPG database 210 may be used to inform users of what television channels or programs are popular and/or provide recommendations to the user. Information from the EPG database 210 may provide the user with a visual interface displayed by a television that allows a user to browse and select television channels and/or television programs for viewing and/or recording. Information used to populate the EPG database 210 may be received via the network interface 206 and/or via satellites, such as satellites 106 of FIG. 1 via the tuners 204. For instance, updates to the EPG database 210 may be received periodically via satellite. The EPG database 210 may serve as an interface for a user to control DVR functions of the television receiver 110, and/or to enable viewing and/or recording of multiple television channels simultaneously.

In addition to being used to provide users with information about scheduled programming, information from the EPG database 210 may be used to determine when television programs begin and end for the purposes of recording. For instance, when a channel-specific file is recorded that contains multiple television channels, the start and end of time of specific television programs within the channel-specific file may be based at least in part on the start and end times indicated in the EPG database 210. Other data may be stored within the EPG database 210 that may be useful in managing channel-specific files, such as series identifiers and episode identifiers, which may be used by a television service provider to identify particular television programs and alternative viewing options.

The decoder 228 may serve to convert encoded video and audio into a format suitable for output to a display device. For instance, the decoder 228 may receive MPEG video and audio from the storage medium 208, or the descrambling engine 224, to be output to a television. MPEG video and audio from the storage medium 208 may have been recorded to the DVR database 216 as part of a previously-recorded television program. The decoder 228 may convert the MPEG video and audio into a format appropriate to be displayed by a television or other form of display device and audio into a format appropriate to be output from speakers, respectively.

The television interface 212 may serve to output a signal to a television, or another form of display device, in a proper format for display of video and playback of audio. As such, the television interface 212 may output one or more television channels, stored television programming from the storage medium 208, such as television programs from the DVR database 216 and/or information from the EPG database 210 for example, to a television for presentation.

The NIT 214 may store information used by the television receiver 110 to access various television channels. The NIT 214 may be stored using the storage medium 208. Information used to populate the NIT 214 may be received via satellite, or cable, via the tuners 204a-c and/or may be received via the network interface 206 from a service provider. As such, information present in the NIT 214 may be periodically updated. The MT 214 may be locally-stored by the television receiver 110 using the storage medium 208.

Information that may be present in the NIT 214 may include, for example: television channel numbers, a satellite identifier, a frequency identifier, a transponder identifier, an ECM (Entitlement Control Message), a PID (Packet Identifier), one or more audio PIDs, and a video PID. A second audio PID of a channel may correspond to a SAP (Second Audio Program) program, such as in another language. In various embodiments, the NIT 214 may be divided into additional tables. For example, rather than the specific audio PIDs and video PIDs being present in the NIT 214, a channel identifier may be present within NIT 214 which may be used to look up the audio PIDs and video PIDs in another table, such as the PMT 226. For example, the PMT 226 may store information on audio PIDs and video PIDs for television channels that are transmitted on a transponder frequency.

Table 1 below provides a simplified example of the NIT 214 for several television channels. It should be understood that in other embodiments, many more television channels may be represented in the NIT 214. The NIT 214 may be at least periodically updated by a television service provider. As such, television channels may be reassigned to different satellites and/or transponders, and the television receiver 110 may be able to handle this reassignment as long as the NIT 214 is updated.

TABLE 1

| Channel | Satellite | Transponder | ECM PID | PMT PID |
|---------|-----------|-------------|---------|---------|
| 4 | 1 | 2 | 27 | 1001 |
| 5 | 2 | 11 | 29 | 802 |
| 7 | 2 | 3 | 31 | 1001 |
| 13 | 2 | 4 | 33 | 804 |

Based at least in part on information in the NIT 214, it may be possible to determine the proper satellite and transponder to which to tune for a particular television channel. In various embodiments, the NIT 214 may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

The values provided in Table 1 are for example purposes only. Actual values, including how satellites and transponders are identified, may vary. Additional information may also be stored in NIT 214. The same PID may be reused on different transponders.

The user interface 218 may include a remote control, physically separate from television receiver 110, and/or one or more buttons on the television receiver 110 that allows a user to interact with the television receiver 110. The user interface 218 may be used to select a television channel for viewing, view information from the EPG database 210, and/or program a timer stored to the DVR database 216 wherein the timer may be used to control the DVR functionality of the control processor 202b.

Referring back to tuners 204, television channels received via satellite, or cable, may contain at least some scrambled data. Packets of audio and video may be scrambled to prevent unauthorized users, such as nonsubscribers, from receiving television programming without paying the television service provider. When one of the tuners 204 is receiving data from a particular transponder of a satellite, the transponder stream may be a series of data packets corresponding to multiple television channels. Each data packet may contain a PID, which, in combination with the NIT 214 and/or the PMT 226, can be determined to be associated with particular television channel. Particular data packets, referred to as ECMs may be periodically transmitted. ECMs may be associated with another PID and may be encrypted; the television receiver 110 may use the smart card 222 to decrypt ECMs. Decryption of an ECM may only be possible when the user (e.g., television receiver 110) has authorization to access the particular television channel associated with the ECM. When an ECM is determined to correspond to a television channel being stored and/or displayed, the ECM may be provided to the smart card 222 for decryption.

When the smart card 222 receives an encrypted ECM, the smart card 222 may decrypt the ECM to obtain some number of control words. In various embodiments, from each ECM received by the smart card 222, two control words are obtained. In various embodiments, when the smart card 222 receives an ECM, it compares the ECM to the previously received ECM. When the two ECMs match, the second ECM is not decrypted because the same control words would be obtained. In other embodiments, each ECM received by the smart card 222 is decrypted; however, when a second ECM matches a first ECM, the outputted control words will match; thus, effectively, the second ECM does not affect the control words output by the smart card 222. The smart card 222 may be permanently part of the television receiver 110 or may be configured to be inserted and removed from television receiver 110.

The central processor 202a may be in communication with the tuners 204 and the control processor 202b. The central processor 202a may be configured to receive commands from the control processor 202b. Such commands may indicate when to start/stop recording a television channel and/or when to start/stop causing a television channel to be output to a television. The central processor 202a may control the tuners 204. The central processor 202a may provide commands to the tuners 204 that instruct the tuners which satellite, transponder, and/or frequency to tune to. From the tuners 204, the central processor 202a may receive transponder streams of packetized data. As previously detailed, some or all of these packets may include a PID that identifies the content of the packet.

The central processor 202a may be configured to create at least one PID filter 220 that sorts packets received from the tuners 204 based at least in part on the PIDs. When a tuner is initially tuned to a particular frequency, such as a particular transponder of a satellite, a PID filter may be created based at least in part on a PID of PMT data. The PID of PMT data packets may be known because it is stored as part of the NIT 214. From the PMT data packets, the PMT 226 may be constructed by central processor 202a.

Table 2 below provides an example extract of a PMT. The PMT 226 may be specific to a particular transponder. As such, when tuning to a different transponder occurs, a new PMT may be created for the different transponder. Accordingly, based at least in part on the information present in the PMT 226, the audio and video PIDs for specific television channels may be identified. A television channel may have multiple audio PIDs due to a second audio program, which may be in a different language.

TABLE 2

| Channel | Video PID | 1$^{st}$ Audio PID | 2$^{nd}$ Audio PID |
| --- | --- | --- | --- |
| 4 | 1003 | 2383 | 2119 |
| 5 | 2993 | 2727 | 2728 |

TABLE 2-continued

| Channel | Video PID | 1$^{st}$ Audio PID | 2$^{nd}$ Audio PID |
| --- | --- | --- | --- |
| 7 | 9238 | 1233 | 0129 |
| 13 | 0012 | 9348 | — |

The values provided in Table s are for example purposes only. Actual values may vary. Additional information or less information may also be stored in the PMT 226.

The PID filter 220 may be configured to filter data packets based at least in part on PIDs. In various embodiments, the PID filter 220 is created and executed by central processor 202a. In other embodiments, separate hardware may be used to create and execute multiple PID filters. Depending on a television channel selected for recording/viewing, a PID filter may be created to filter the video and audio packets associated with the television channel, based at least in part on the PID assignments present in the PMT 226. For example, when a transponder data stream includes multiple television channels, data packets corresponding to a television channel that is not desired to be stored or displayed by the user, may be ignored by PID filters. As such, only data packets corresponding to the one or more television channels desired to be stored and/or displayed may be filtered and passed to either the descrambling engine 224 or the smart card 222; other data packets may be ignored. For each television channel, a stream of video packets, a stream of audio packets, one or both of the audio programs, and/or a stream of ECM packets may be present, each stream identified by a PID. In various embodiments, a common ECM stream may be used for multiple television channels. Additional data packets corresponding to other information, such as updates to the NIT 214, may be appropriately routed by the PID filter 220. At a given time, one or multiple PID filters may be executed by the central processor 202a.

The descrambling engine 224 may use the control words output by the smart card 222 in order to descramble video and/or audio corresponding to television channels for storage and/or presentation. Video and/or audio data contained in the transponder data stream received by the tuners 204a-c may be scrambled. Video and/or audio data may be descrambled by descrambling engine 224 using a particular control word. Which control word output by the smart card 222 to be used for successful descrambling may be indicated by a scramble control identifier present within the data packet containing the scrambled video or audio. Descrambled video and/or audio may be output by the descrambling engine 224 to the storage medium 208 for storage in the DVR database 216 and/or to the decoder 228 for output to a television or other presentation equipment via the television interface 212.

For brevity, the television receiver 110 is depicted in a simplified form, and may generally include more or fewer elements or components as desired in accordance with the present disclosure. For example, the control processor 202b may have a viewership data engine 113 that is configured to facilitate identification, aggregation, consolidation, and qualification of viewership data pertinent to users of the television receiver 110 in accordance with various embodiments disclosed herein. The viewership data engine 113 may be configured with logic to process, analyze, retrieve, pull, cause transmission of, derive, compile, aggregate, categorize, characterize, rank, handle, store, report, and/or present any suitable information/content pertaining to viewership—e.g., implicit content ratings derived from histories and patterns of content/television receiver operations responsive to user selections. The receiver operations may include outputting content items for display, recording content items, and/or deleting recorded content items—which operations may be mapped, for example, to one or a combination of viewing, recording, recording then viewing, recording but not viewing, viewing percentages of individual content items (e.g., how much of a program/movie did the viewer actually watch), deleting recordings, and/or explicit content ratings input by viewers with respect to content items. The viewership data engine 113 may be configured to cause viewership information to be transmitted to the service provider system 102 for analysis in order to make intelligent encoding adjustments based at least in part on viewership. Such information may be provided to a television service provider via network interface 206. Additionally, in various embodiments, viewership information may be stored in a viewership data store 230 of the television receiver 110. In various embodiments, the viewership data engine 113 may be configured to generate user interfaces that allow a user to provide feedback on specific content that a user liked or disliked. The viewership data engine 113 may be configured to solicit and process feedback received from a user for content. For example, the viewership data engine 113 may be configured to present information and user-selectable options to allow for content rater profile creation, profile modification, content rating, content recommendation, and/or the like. The viewership data engine 113 may be configured to process selections and other input in response to such options.

The control processor 202b may have a content access engine 111 that is configured to facilitate content access to multiple local and/or remote content resources. For example, the content access engine 111 may be configured to facilitate content access to the alternative viewing options disclosed herein. In various embodiments, the content access engine 111 may be configured to query and retrieve content from content resources via network interface 206 in accordance with stored content access credentials in content access data store 232 of the television receiver 110.

The control processor 202b may have an EPG rendering engine 115 that may be configured to cause an EPG to be output that is based at least in part on data from EPG database 210 and information about the availability of at least portions of television programs via alternative viewing options. The television receiver 110 may receive communications from the service provider 102 about alternative viewing options, e.g., when a program is not transmitted or is degraded in quality, as disclosed further herein. Responsive to such communications (e.g., data and/or metadata specifying the alternative viewing options for a given program), the control processor 202b may control presentation attributes and options for the alternative viewing options for particular television programs indicated in a presented EPG, such as graphical/descriptive indicia and user-selectable options for the programs. In various embodiments, the content access engine 111 may work in conjunction with the EPG rendering engine 211 to facilitate, via an EPG, the provision of content rating options and/or acquisition of input by user, in accordance with various embodiments disclosed herein.

For simplicity, the television receiver 110 of FIG. 2 has been reduced to a block diagram; commonly known parts, such as a power supply, have been omitted. Further, some routing between the various modules of television receiver 110 has been illustrated. Such illustrations are for exemplary purposes only. The state of two modules not being directly or indirectly connected does not indicate the modules cannot communicate. Rather, connections between modules of the television receiver 110 are intended only to indicate possible common data routing. It should be understood that the modules of the television receiver 110 may be combined into a fewer number of modules or divided into a greater number of modules. Further, the components of the television receiver 110 may be part of another device, such as built into a television. Also, while the television receiver 110 may be used to receive, store, and present television channels received via a satellite, it should be understood that similar components may be used to receive, store, and present television channels via a cable network.

Figure 3:
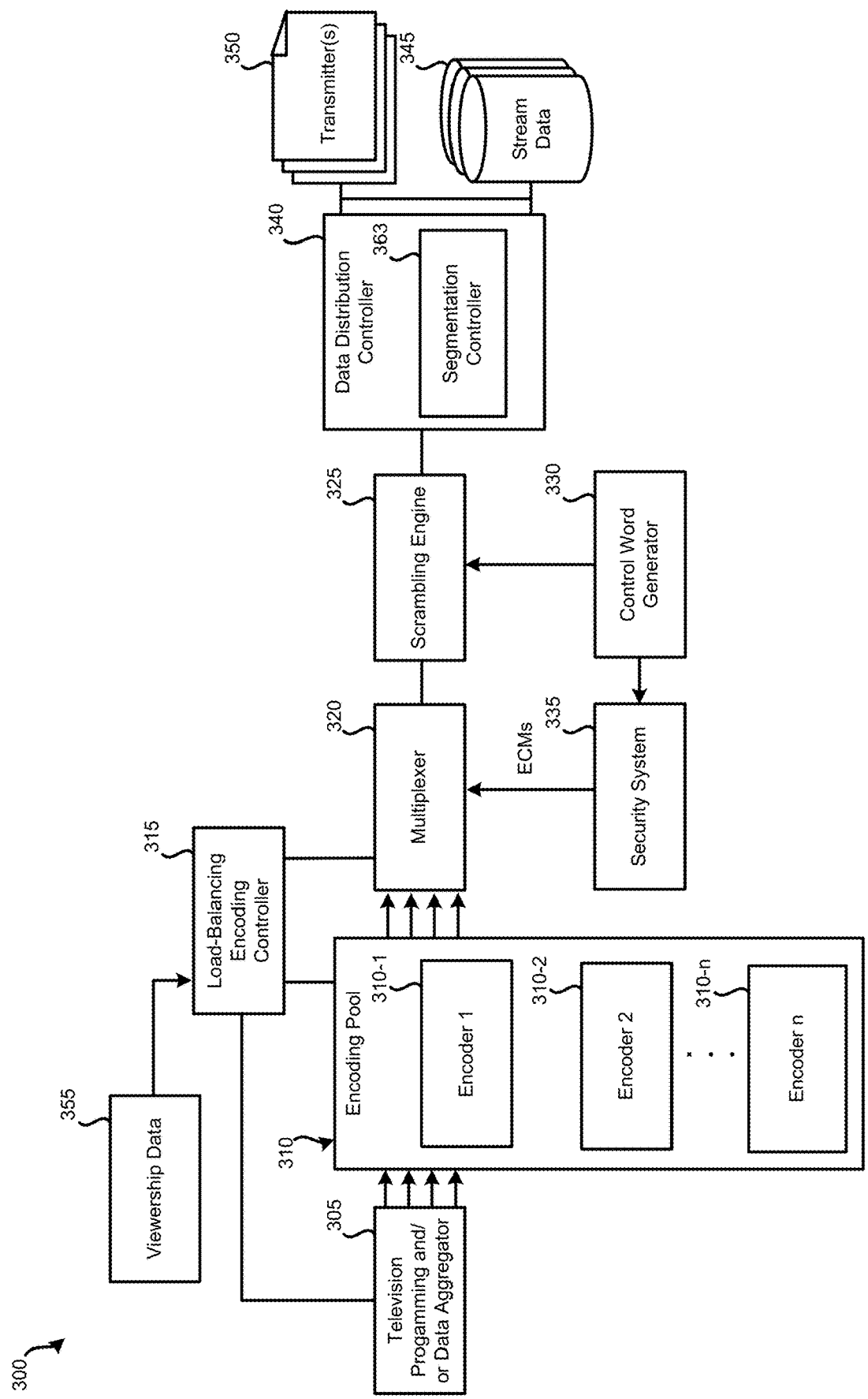
FIG. 3 illustrates a video handling system, in accordance with various embodiments of the present disclosure.

FIG. 3 illustrates a video handling system 300, in accordance with various embodiments of the present disclosure. In various embodiments, the video handling system 300 may be part of television service provider system 102. As such, before data is transmitted to set-top boxes via satellite, the video handling system 300 may be used to prepare data streams for data distribution schemes according to various embodiments. The video handling system 300 may include: television programming and/or data aggregator 305, encoding pool 310, load-balancing encoding controller 315, control word generator 320, security system 330, multiplexer 320, scrambling engine 325, control word generator 330, security system 335, data distribution controller 340, stream data repository 345, and/or transmitters 350.

The video handling system 300 may be configured to estimate, measure, or otherwise calculate the bandwidth of a transmitting transport stream. With such as a bandwidth metric, the video handling system 300 may adjust weighting of video encoding bit rates of particular content items based at least in part on the real-time or near real-time percentage of the audience that is viewing or is anticipated to view the particular content items. Further, the video handling system 300 may group and/or split one or more portions of content items into one or more multiplexed transport channels that are configured to increase and/or decrease the usage of the available bandwidth on the transponder of the satellite. Accordingly, the video handling system 300 may be configured to maximize and/or optimize the usage of the available bandwidth on the transponder of the satellite.

In various embodiments, the video handling system 300 may receive data and/or television content from one or more television channels from one source or multiple different sources, such as directly from the networks that produced the content on the television channels. Each television channel that is to be transmitted on a particular transponder stream via a transponder of a satellite may be provided to multiplexer 320. Multiplexer 320 may create a digital stream of data packets containing the video, audio, and other data, such as entitlement control messages (ECMs), to be transmitted on the transponder data stream. The data stream, which includes video and/or audio data packets that are not scrambled, may be passed to scrambling engine 325. Scrambling engine 325 may use a control word to scramble video or audio present in a data packet. Some audio and video packets may also pass through with no scrambling, if desired by the television service provider.

Control word generator 335 may generate the control word that is used by scrambling engine 325 to scramble the video or audio present in the data packet. Control words generated by control word generator 335 may be passed to security system 335, which may be operated by the television service provider or by a third-party security provider. The control words generated by control word generator 335 may be used by security system 335 to generate an ECM. Each ECM may indicate two control words. The control words indicated may be the current control word being used to scramble video and audio, and the control word that will next be used to scramble video and audio. Security system 335 may output an ECM to multiplexer 320 for transmission to subscribers' set-top boxes. Each data packet, whether it contains audio, video, an ECM, or some other form of data, may be associated with a particular PID. This PID may be used by the set-top box in combination with the networking information table to determine which television channel the data contained within the data packet corresponds. Accordingly, the transponder data streams may contain scrambled video packet stream and audio packet stream and also an encrypted ECM packet stream which contains the control words necessary to descramble the scrambled video and audio packets.

The video handling system 300 may be configured for facilitating one or more satellite data distribution schemes, in accordance with various embodiments of the present disclosure. The data distribution controller 340 may be configured to manage how data is separated, replicated, distributed, and/or otherwise prepared for two or more data streams. The functions of the data distribution controller 340 may be implemented in software and/or hardware. In various embodiments, as depicted, the data distribution controller 340 may be employed downstream with respect to certain components, such as the scrambling engine 325; in alternative embodiments, the data distribution controller 340 may be employed upstream with respect to certain components, such as the scrambling engine 325.

In various embodiments, the data distribution controller 340 may include one or more segmentation controllers 364. The segmentation controller 364 may be configured to logically segment the digital stream such that different segments are provided for different transponder data streams. The segmentation controller 364 may receive a digital stream of data packets containing the video, audio, and other data corresponding to a content item, divide the digital stream into components, and buffer the resultant components for transmission and/or further processing. In various embodiments, the segmentation controller 364 may stage the segmented data in one or more stream data repositories 345. In various embodiments, certain segmented sets of data are segregated into certain repositories 345. In various embodiments, the segmented data may be provided directly to the one or more transmitters 350. In various embodiments, segmentation controller 364 may provide segmented data to multiple repositories 345 or transmitters 350 simultaneously.

Various embodiments may employ various levels of division. For example, in various embodiments, the level of division may be packet-based, byte-based, and/or bit-based. Groupings of one or more packets may be segment for different routing. However, any suitable level of division, including any suitable segmentation size, may be employed. In various embodiments, the segmentation size may depend on the number of transponder streams to be provided. In various embodiments, the segmentation size may depend on other factors, such as storage, transfer, and/or processing constraints and/or performance characteristics. The segmented components may be distributed in the same way for transmission with multiple transponder streams.

In various embodiments, the data distribution controller 340, executing the transport channel generation logic, may generate one or more transport channels based at least in part on direction from the load-balancing encoding controller 315. As disclosed herein, the direction from the load-balancing encoding controller 315 may be based at least in part on determined bit rates of content items and on the available bandwidth of the one or more transponders. In various embodiments, the data distribution controller 340, executing the transport channel generation logic, may split a selected content item into two or more portions. The data distribution controller 340 may split a content item to utilize at least some available capacity of transponders that are currently, or are anticipated to be, transmitting only a portion of their available bandwidth capacity.

With the data distribution controller 340 having prepared data for transponder data streams, one or more transponder data streams may be transmitted by one or more transmitters 350 to one or more satellites, such as satellite(s) 106, for relay to the television receivers 110. In various embodiments, multiple transponder data streams may be transmitted by a single transmitter 350 to one or more satellites 106. In various embodiments, multiple transmitters 350 may be used to transmit the transponder data streams to one or more satellites 106. In various embodiments, a separate transmitter 350 per transponder stream may be used for transmission. In various embodiments, data may be separated, replicated, and/or distributed across two or more of the satellites and/or transponders.

With statistical multiplexing, different channels may be provided with different, varying bit rates. One challenge for the transmission of content items (e.g., television programs, movies, and the like) may be limited throughput of a transport channel. However, various embodiments according to the present disclosure may provide improvements that allow for more content items and channels to be transmitted within certain bandwidths of transport channels, even though the bandwidths of the transport channels may be fixed. Various embodiments may employ various multiplexing techniques. For example, various embodiments may employ statistical multiplexing, time division multiplexing, frequency division multiplexing, code division multiplexing, and/or the like. In various embodiments, various content items may be multiplexed in various ways. The number of content items transmitted via a single transport channel may be based at least in part on the bandwidth capacity provided by a transponder on a satellite and the bandwidth utilization of each of the content streams. By way of example, if a given transponder provides 30 megabits per second (Mbits/s) capacity, and each program content stream consumes four Mbits/s, then as many as seven content streams may be communicated via the transport channel. The transport channel may include a multiplexed portion of multiple content items each containing video, audio, and/or data corresponding to a given program. Media content portions may include MPEG ("Motion Picture Experts Group") packets that contain compressed and/or encrypted video, audio, and/or other data. In addition, content portions may be encapsulated and/or formatted in other ways, such as by use of other or additional transport, compression, and/or encryption techniques. Then, the one or more of the multiplexed transport channels (e.g., dozens or more transport channels) are uplinked to one or more satellites, via a corresponding transmit antenna. The transport channel may be uplinked using a wireless signal.

In various embodiments, the load-balancing encoding controller 315 may be configured to intelligently control the encoding and/or multiplexing processes. The load-balancing encoding controller 315 may be integrated with the multiplexer 320 in various embodiments. In other embodiments, the load-balancing encoding controller 315 may be separate from the multiplexer 320.

In various embodiments, the video handling system 300 may store transponder information, for example, in the stream data repository 345 or another memory and/or storage location, which may be included in the load-balancing encoding controller 315 in various embodiments. The transponder information may include bandwidth specifications for one or more transponders. In various embodiments, the load-balancing encoding controller 315 may determine particular transponder capacities based at least in part on the bandwidth specifications. A specified bandwidth capacity may define an upper limit on an amount of data that can be transmitted by via a given transponder. With certain cases, the specified bandwidth capacity may not be an absolute bandwidth capacity for a given transponder, but rather a specified operational capacity allotted for the transponder, such as 85% or any suitable portion of the transponder's absolute bandwidth capacity. The stored transponder information may further include the particular transponder capacities, available bandwidth for particular transponders, current utilization of particular transponder capacities, remaining capacity of particular transponders, past utilization of particular transponder capacities, predicted utilization of particular transponder capacities, and/or the like. A transponder's bandwidth utilization may indicate the current or anticipated amount of data currently being transmitted by the transponder. A residual bandwidth may indicate the remaining capacity of the transponder.

In various embodiments, the load-balancing encoding controller 315 may determine available bandwidth for particular transponders, current utilization of particular transponder capacities, remaining capacity of particular transponders, past utilization of particular transponder capacities, predicted utilization of particular transponder capacities, and/or the like. Having determined particular transponder capacities, the load-balancing encoding controller 315 may adjust encoding rates of content items to be communicated via transport channels and/or direct the addition of one or more other additional content items via the transport channels. In various embodiments, the load-balancing encoding controller 315, may monitor the amount of residual bandwidth available on given transport channels, and as sufficient bandwidth capacity becomes available, adjust encoding rates of content items to be communicated via transport channels and/or begin to communicate one or more other additional content items via the transport channels. Additionally, in various embodiments, the load-balancing encoding controller 315 may direct certain content items to one or more alternative transport channels that have underutilization of transponder capacity. In various cases, as disclosed above, that may include splitting a content item between multiple transport channels in order to maximize use of transponder capacity.

In various embodiments, the video handling system 300 may assess content items according to a combination of metrics. For example, the load-balancing encoding controller 315 may quantify and qualify the content items aggregated by the television programming and/or data aggregator 305. The assessment of content items according to the combination of metrics may include calculating one or more metrics as a function of time. By way of example, the quantification may include quantifying numbers of content items for particular time periods, such as quantifying numbers of television programs scheduled for a particular time slot. As another example, playback times, scheduled presentation times, durations, and/or the like of the content items may be determined. As yet another example, the quantification may include determining bit rates of the content items. A bit rate may correspond to the number of bits used per unit of playback time to represent a continuous medium such as audio or video after data compression. In various embodiments, an average bit rate, a maximum instantaneous bit rate, and/or the like may be determined to represent the bit rate.

In various cases, bit rates of content items received at the aggregator 305 may be specified by metadata within the content items. For example, the metadata could be included in header data of files received by the aggregator 305. In such cases, the load-balancing encoding controller 315 may detect the specified bit rates by extracting and recognizing the metadata of the content items. In alternative or in combination, in various cases, bit rates of content items may be determined by processing the content items in whole or in part. In such cases, the load-balancing encoding controller 315 may execute video analysis logic, which may be stored in the controller's memory in various embodiments, to sample or completely process the content items in order to determine initial bit rates of the content items. For example, various embodiments of the load-balancing encoding controller 315 may receive a processed content item and execute content item sampling logic to determine a bit rate of the processed content item. In various embodiments, the bit rate may be determined based at least in part on the size of a content item file, an estimation based at least in part on sample bit rates taken during a transmission of the content item, and/or the like. In various embodiments, the video processing may be performed in order to determine complexities of the content (e.g., fast-changing content versus slow-changing content, such as a "talking head"). Various embodiments that perform intra-program encoding adjustments may use the complexity data to make determinations as to how encoding bit rates of the next frame, scene, or segment could be adjusted in conjunction with other qualification metrics of the content item.

The qualification of the content items may include characterizing the content items based at least in part on viewership data 355 that the video handling system 300 maps to the content items. In various embodiments, the viewership data 355 and the determination of viewership characteristics may be based at least in part on real-time or near real-time back-channel information from viewing devices (e.g., television receivers) indicating the channels and/or content items being viewed and/or recorded. This information may be compiled in real-time or near real-time and may be used to weight encoding performed by the encoding pool 310 to dynamically adjust bit rates of channels and/or content items based at least in part on viewership rankings and available transponder bandwidth. As one example, feedback from the viewer devices may be sent via back channels to the video handling system 300 (e.g., the aggregator 305 and/or the load-balancing controller 315) that indicates an increase in a number of viewers at a beginning of a premier airing of a next season of a popular program series. Detecting the increase in viewers, the load-balancing encoding controller 315 may weight the encoding pool so that the channel with the premier airing (or specifically the content for the premier airing) is allocated a greater bit rate(s) and more transponder bandwidth than other channels (or specific content items) in the video pool that may, for example, be playing a rerun of an old movie.

In various embodiments, the load-balancing encoding controller 315 or another component of the video handling system 300, such as the aggregator 305, may include a harvesting engine configured to harvest viewership data 355 about viewership of content items. The harvesting engine may work in conjunction with television receivers 110 and/or devices 116 to gather viewership data 355 on content items viewed, content items recorded, viewer profiles, viewer selections, viewer geolocations, viewer ratings of content items, viewing history, explicit user preferences, user characteristics, and/or the like. The harvesting engine may be configured to perform any one or combination of features disclosed herein and directed to facilitating viewership data 355 capture regarding content items and viewership. In various embodiments, the viewership data 355 may be transmitted to (pushed to or pulled by) the video handling system 300 periodically or on any suitable basis. User preferences (inferred preferences from programs viewed/recorded and/or explicitly user-indicated preferences) may be stored locally by a television receiver 110 and/or devices 116 or may be stored remotely by the television service provider, and may define the user's viewing preferences regarding particular programs, particular program series, particular channels, program times, programs viewed versus recorded, content genre, content type, actors, actresses, directors, rating, etc.

In various embodiments, compilation of viewing and recording statistics may occur whenever a user has the television receiver 110 and/or device 116 outputting television programming. Statistics may be measured and stored by the television receiver 110 and/or devices 116, and may log characteristics of television programming, which could be detailed in associated metadata and/or EPG information. An entry in a data structure may be maintained for each television program viewed and/or recorded. In various embodiments, an entry may only be maintained if a television program has been played for at least a threshold period of time (e.g., 5 minutes). Accordingly, while a user is watching television via the television receiver 110 and/or device 116, statistics may be compiled by the television receiver 110 and/or device 116 as to what the user is watching and how long the user has been watching it. Similarly, statistics may be compiled to differentiate programs recorded but not viewed from programs recorded and played for at least a threshold amount of time.

Aggregated viewership data 355 may be analyzed to identify a set of one or more viewership characteristics with respect to content items. In various embodiments, the load-balancing encoding controller 315 or another component of the video handling system 300, such as the aggregator 305, may include a classification engine configured to analyze, classify, and score content items in view of the viewership data 355. Having viewership data 355, the video handling system 300 may implement a content item qualification process. Based at least in part on the viewership data 355, the load-balancing encoding controller 315 may differentiate and qualify one or a combination of on content items viewed, content items recorded, viewer profiles, viewer selections, viewer geolocations, viewer ratings of content items, viewing history, explicit user preferences, user characteristics, and/or the like. Various embodiments may employ a decision tree, checklist, workflow, and/or the like to capture various aspects of viewership data and assess those aspects to infer content item qualification.

In various embodiments, viewership data and characterizations about a content item may be retained as a content category profile. A content category profile may include past viewership data and characterizations mapped to content items corresponding to a category. In various embodiments, the aggregator 305 and/or the load-balancing encoding controller 315 may extract and recognize metadata provided with the content items and match the content items with one or more categories. Having identified attributes of content items based at least in part on the metadata, the matching engine may use rules to match the content items to one or more categories from a category information repository. The rules may include criteria for matching a set of indicia of content items attributes to a set of one or more categories. The content item qualification process could take into account previously logged viewership data characterizations about a given content item and/or content category. Thus, the video handling system 300 may implement a content item data search and category matching process.

Any suitable category may be employed to facilitate viewership-based features in accordance various embodiments. By way of example, a category of content items may include a series of episodes of a given program series. Another example of category may include a type of program (e.g., a football game) having a certain characteristic (e.g., a particular team playing in a particular city). Yet another example of category may include reruns of a type of program (e.g., Westerns from the 1960s and 1970s). Further, for newly televised content items, category information may include categories and corresponding criteria to qualify for particular categories such as actors/actresses, directors, the types of television programming (e.g., series, movies, live events), the duration of programs, the genre of television programming (e.g., drama, comedy, documentary), a rating (e.g., G, PG, PG-13, R), and/or the like. Many other example attributes and categories are possible and contemplated. Accordingly, various embodiments may provide for reliable content item matching and qualifying in view of historical data about content items and viewership data.

Various embodiments may qualify a content item according to a gradated viewership scale. Any suitable viewership scale may be used in various embodiments. In various embodiments, a viewership scale could entail a categorization scheme, with categories such as high viewership, medium viewership, and low viewership, or any suitable categories. In various embodiments, a viewership scale could entail a content item scoring system. The content item scoring system could be correlated to the category scheme in various embodiments, such that certain scores correspond to certain categories. In various embodiments, a viewership score may be a composite of scores assigned based at least in part on differentiated metrics applied to the viewership data 355. For example, the load-balancing encoding controller 315 may differently score content items and/or categories based at least in part on one or a combination of on content items viewed, content items recorded, viewer profiles, viewer selections, viewer geolocations, viewer ratings of content items, viewing history, explicit user preferences, user characteristics, and/or the like. Further, viewing patterns may be determined (e.g., viewers watching the same program multiple times, recording a series, watching once, watching for short time then discontinuing watching, etc.). Content items that viewers actually view versus just having recorded may be differentiated. Likes and dislikes may be inferred from the viewership data 355.

Various embodiments may score a content item with a numerical expression, for example, a viewership score. A viewership score may be an assessment of a content item's current, past, and/or predicted viewership. Accordingly, a viewership score may indicate which content items have had, currently have, and or are forecasted to have greater viewership than other content items. In addition to or in alternative to employing real-time viewership qualification, various embodiments may predict viewership of content items based at least in part on historical viewership data of specific content items (e.g., in the case that the content items are to be rebroadcasted) and/or of one or more categories to which content items are mapped. Accordingly, various embodiments may accord viewership scores based at least in part on such corresponding historical viewership data, which may include previous viewership scores in various embodiments.

By way of example without limitation, a viewership scale could include a range of content item scores from 0 to 100, or from 0 to 1,000, with the high end of the scale indicating greater probability. Various embodiments may use methods of statistical analysis to derive a viewership score. Various embodiments may determine a viewership score based at least in part on any one or more suitable quantifiers. And various embodiments may correlate scores to the categorization scheme. By way of example, a viewership score of a content item in the top third may be correlated to high viewership, a score in the bottom third may be correlated to low viewership, and a score in the middle third may be correlated to medium viewership.

Various embodiments may differentiate between programs recorded (including programs scheduled to be recorded) and programs viewed. For example, programs viewed may be accorded a higher number of points than programs recorded. In some implementations, programs recorded then viewed may be accorded a higher number of points than programs simply viewed. Various embodiments may accord varying numbers of points (e.g., proportionally) contingent on how much of a program is watched (e.g., 10%, 50%, 90%, etc.). Various embodiments may take into account explicit user input and accord numbers of points accordingly. For example, user-selectable options to provide ratings of particular programs may be provided by the television receivers 110 and/or devices 116. Viewership scores may be adjusted in view of the ratings provided. Such differentiation may be deemed to take into account varying levels of viewer interest.

Various embodiments may employ geo-discrimination to differentiate which content items are likely to have greater viewership in certain geo-locations as compared to other content items. For example, a viewership score for a football game may be assigned a greater number of points when the service area includes a hometown of one of the football teams playing in the game. Hence, the viewership score for the game may be higher when there is a correlation between the game a particular geolocation than when there is not such a correlation. Likewise, the system 300 may recognize situations where a significant viewership exists in geolocations that not hometowns of the football teams playing in the game. For example, a geo-tailored viewership score for the football game may be assigned a greater number of points when the service area includes a significant number of fans even though there is no explicit connection to the football game. Hence, the viewership score for the game may be higher when the system 300 accounts for a significant pocket of fans of the Denver team that are located in Green Bay, even though the team from Green Bay is not playing the game. Accordingly, various embodiments may more accurately differentiate which content items are likely to have greater viewership in various geo-locations.

In various embodiments, location information may be captured to facilitate such geo-sensitive viewership differentiation. In various embodiments, location information may be determined by television receivers 110 and/or devices 116, and such information may be sent to the system 300. The television receivers 110 and/or devices 116 may, in various embodiments, have location detection capabilities based at least in part on device GPS capabilities, access points, subscriber/account information, and/or the like, and corresponding location information may be transmitted to the system 300. In various embodiments, the system 300 may gather the location information. In various embodiments, where the location information does not explicitly indicate a geolocation, the system 300 may determine geolocations by cross-referencing subscriber/account identifiers with stored geolocation information associated with subscribers/accounts.

In various embodiments, the video handling system 300 may implement load-balancing rules to take action based at least in part on the viewership qualification. Some load-balancing rules may specify that one or more particular channels and/or content items should always be encoded with a certain bit rate, while bit rates of other channels and/or content items may be dynamically adjusted. Such dynamic adjustment may include changing resolution according to a linear function (e.g., 10, 100, 1000, etc.), an incremental function (e.g., applying a certain delta), and/or a non-linear function. Accordingly, the rules may specify static encoding parameters for certain channels and/or content items and dynamic encoding parameters for others.

In addition or in alternative, various embodiments of the load-balancing rules may specify certain minimum bit rates needed to represent channels and/or content items with minimum quality levels. Varying minimum quality levels may be accorded to different channels and/or content items in various embodiments. While a certain bit rate may be required to maintain a threshold picture quality, the rules may further specify that, to the extent that additional transponder channel bandwidth is available over and above that which is needed for the minimum quality levels, additional bits be applied to the bit rates of channels and/or content items based at least in part on viewership qualifications. In addition or in alternative, some load-balancing rules may specify that one or more particular channels and/or content items should always encoded with a greater or lesser bit rate than other channels and/or content items. Accordingly, the rules may specify relative encoding parameters for certain channels and/or content items, which are relative to other channels and/or content items.

In addition or in alternative, some load-balancing rules may specify that at least some channels and/or content items be ranked according to qualification metrics. For example, some rules may provide for ranking channels and/or content items according to viewership scores assigned to the channels and/or content items. As another example, some rules may provide for ranking channels and/or content items according to viewership categories assigned to the channels and/or content items. Based at least in part on channels and/or content items ranked according to qualification metrics, the rules may specify allocation of bit rates and transponder channel bandwidth in accordance with the ranking. Thus, bit rates for higher-ranked channels and/or content items may be greater than bit rates for lower-ranked channels and/or content items. In addition or in alternative, some rules may specify that bit allocation may be based at least in part complexities of the contents. For example, may specify that more bits should be allocated to more complex content than to less complex content.

Accordingly, the video handling system 300 may dynamically adjust encoding of content items based at least in part on estimated, specified, and/or measured bandwidth utilization of the transponders; based at least in part on date, time period, and television channel specified for the content items; and based at least in part on quantity and qualification metrics of the content items. The dynamic encoding adjustment may allow certain content items to consume lower amounts of bandwidth relative to other content items at least partially by applying load-balancing rules to qualification metrics determined for the content items. Higher compression rates may be applied to some content items, such as those with substantially static video content, to achieve lower bandwidth utilization for such content items and a corresponding increase in residual bandwidth for a given carrier signal. The load-balancing encoding controller 315 may elect to dynamically utilize the amount and/or bandwidth by increasing the bit rate of other content items transmitted via the residual bandwidth of the transport channel.

In various embodiments, the load-balancing encoding controller 315 may calculate a residual bandwidth of a transponder. Based at least in part on the calculated residual bandwidth, the load-balancing encoding controller 315 may direct multiplexing of a portion of a given content item with a plurality of content items into a currently transmitting transport channel. The load-balancing encoding controller 315 may also direct dynamic generation of an additional transport channel that includes a portion of a given content item already transmitting on a transport channel.

In various embodiments, some load-balancing rules may provide for crashing (i.e., not transmitting) certain programs in some circumstances so that the corresponding content items are not encoded and/or not transmitted. In various embodiments, certain content items may be predetermined as expendable and, thus, subject to crashing when sufficient bandwidth is not available to meet criteria (e.g., minimum quality levels) for other non-expendable content items. In other embodiments, expendable content items may be determined as lowest ranked according to qualification metrics and, thus, identified as expendable by the load-balancing encoding controller 315 rather than being previously denoted as expendable.

In the event of crashing certain programs, the video handling system 300 may, in various embodiments, provide for catch-up services 114, where the crashed content items are available multiple times or may be available after their initial on-air time. In various embodiments, the content items may be automatically recorded by the service provider and may be made available to television receivers as alternatives. The automatically recorded content items may be available on a streaming basis and may be available for viewing on demand in lieu of the scheduled broadcast. In various embodiments, the stored content items may be stored indefinitely or may be stored for a fixed time such as a week, a month, or a year. In various embodiments, the content items that are automatically recorded by the service provider may be identified to television receivers and may be identified in electronic programming guide provided by the television receivers.

In various cases, crashed content items may have corresponding repeat showings planned for the future. In other cases, crashed content items may be repeat airings of previously aired programming events. Various embodiments may take either or both types of such cases into account. In various embodiments, the video handling system 300 may identify that a repeat airing corresponding to a particular program is scheduled and/or that a previous recording corresponding to a particular programs is available. Any one or combination of such alternative viewing options could be identified to television receivers and/or in electronic programming guides. In particular, programs may be marked or otherwise identified as alternatively available for streaming or download. In various embodiments, the programs may be available from different service providers. Various embodiments may additionally or alternatively provide such alternative viewing options for content items that are not crashed but are degraded in quality from specified bit rates.

The programs that may be available with alternative viewing options may be identified with metadata transmitted to television receives with the EPG data, over the air with content items, separately from the EPG data, and/or the like. The metadata may include various information regarding a given alternative viewing option, such as information about the expected time of availability of a recorded program, the expected quality of video and audio encoding, the service provider associated with the recording, and/or the like. Also included may be metadata required (e.g., a link to a streaming resource) to redirect either directly to the content file for delivery or to a webpage from which the link to the content file may be made. The metadata may facilitate user-selectable options for the alternative viewing options that may be presented an EPG.

In various embodiments, the load-balancing encoding controller 315 may control the encoding pool 310 or otherwise specify the encoding pool 310 to balance the encoding bit rates of various content items in view of bandwidth of one or more transponder channels. Under such direction, the encoders 310 may perform weighted compression to dynamically adjust video bit rates of the content items in order to optimize bandwidth utilization based at least in part on viewership data 355. Accordingly, more bits may be allocated to those video services that have a higher viewer percentage.

For simplicity, the video handling system 300 has been reduced to a block diagram, other common components have been omitted. Further, some routing between the various modules of the video handling system 300 has been illustrated. Such illustration is for exemplary purposes. Regardless of whether two modules are directly or indirectly connected, the modules may be able to communicate. Connections between modules are intended only to indicate possible common routing. It should be understood that the modules of the video handling system 300 may be combined into a fewer number of modules or divided into a greater number of modules.

In various embodiments, the video handling system 300 may include any device or set of devices configured to compute, process, organize, categorize, qualify, send, receive, retrieve, generate, convey, store, display, present, detect, handle, and/or use any form of information and/or data suitable for embodiments described herein. In various embodiments, the video handling system 300 could include a single computing device, a server, one or more video encoders, specialized media processors, multiple computing devices, and/or the like which may be implemented in or with a distributed computing and/or cloud computing environment with a plurality of servers and cloud-implemented resources.

Figure 4:
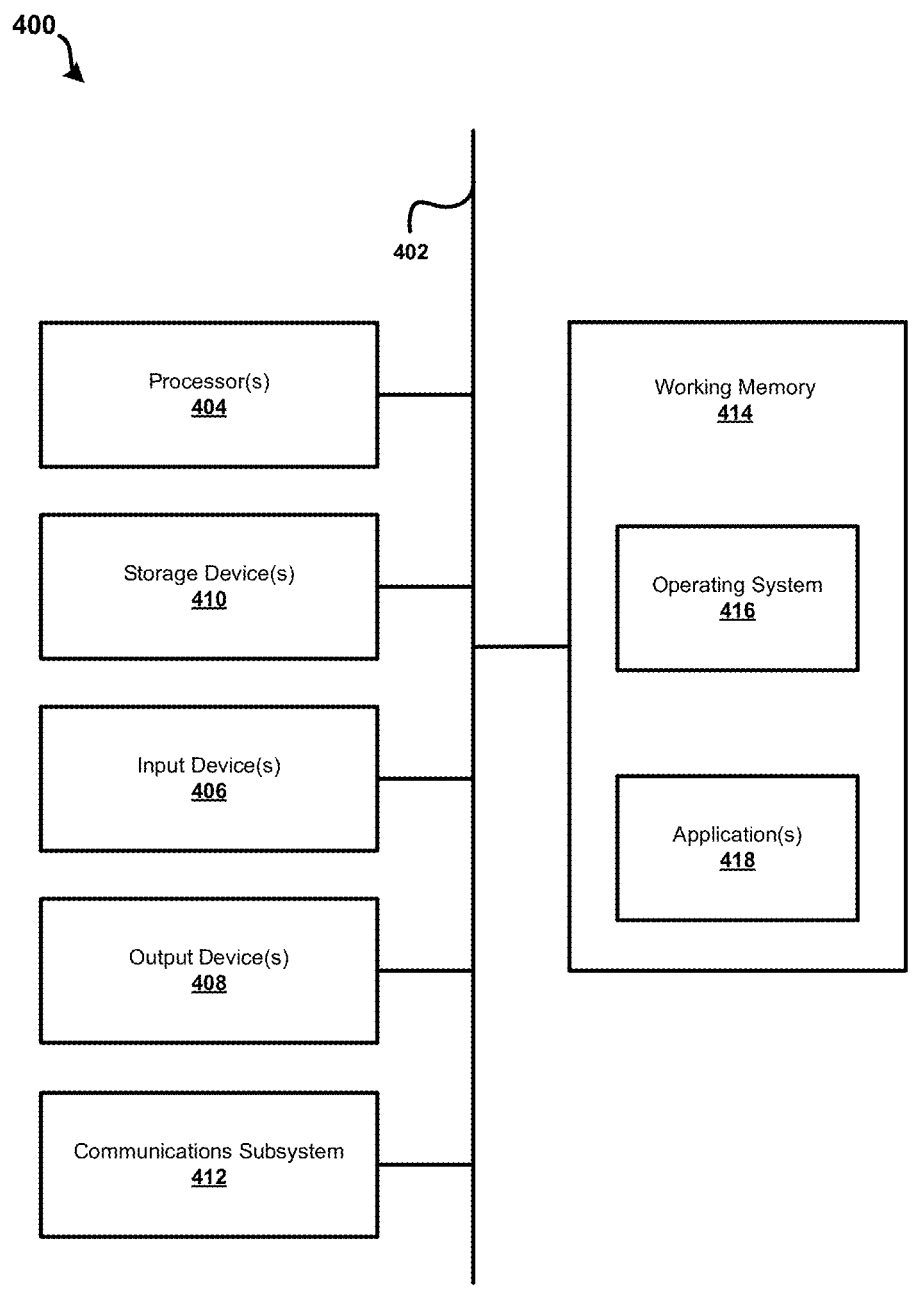
FIG. 4 illustrates an embodiment of a computer system that may be incorporated as part of the television receiver, a television service provider system, and/or a video handling system, in accordance with various embodiments of the present disclosure.

A computer system as illustrated in FIG. 4 may be incorporated as part of the previously described computerized devices, such as a television receiver, a television service provider system, and/or a video handling system. FIG. 4 provides a schematic illustration of one embodiment of a computer system 400 that can perform various steps of the methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, video decoders, and/or the like); one or more input devices 415, which can include without limitation a mouse, a keyboard, remote control, and/or the like; and one or more output devices 420, which can include without limitation a display device, a printer, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 430 may permit data to be exchanged with a network (such as the network described below, to name one example), other computer systems, and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 425 described above. In various cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, various embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 might cause the processor(s) 410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media might be involved in providing instructions/code to processor(s) 410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 430 (and/or components thereof) generally will receive signals, and the bus 405 then might carry the signals (and/or the data, instructions, etc. carried by the signals) to the working memory 435, from which the processor(s) 410 retrieves and executes the instructions. The instructions received by the working memory 435 may optionally be stored on a non-transitory storage device 425 either before or after execution by the processor(s) 410.

It should further be understood that the components of computer system 400 can be distributed across a network. For example, some processing may be performed in one location using a first processor while other processing may be performed by another processor remote from the first processor. Other components of computer system 400 may be similarly distributed. As such, computer system 400 may be interpreted as a distributed computing system that performs processing in multiple locations. In some instances, computer system 400 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A method of media content distribution for a multi-channel content distribution system, the method comprising:
   receiving, by a video handling system, a content item comprising video data, the content item corresponding to media for delivery to a plurality of television receivers via a set of one or more channel components;
   detecting, by the video handling system, at least one metric of the content item as a function of time;
   qualifying, by the video handling system, the content item based at least in part on viewership data, the qualifying to yield a qualification result for the content item, where the qualification result corresponds to a viewership score specified for a geolocation;
   implementing load-balancing rules to take action based at least in part on the qualifying at least partially by:
   ranking, by the video handling system, the content item with respect to a plurality of content items based at least in part on the viewership score specified for the geolocation;
   based at least in part on the ranking, executing, by the video handling system, sampling logic to determine a first bit rate of the content item based at least in part on a size of the content item and/or estimating the first bit rate from one or more sample bit rates taken during transmission of at least a portion of the content item;
   using the determined first bit rate to make one or more adjustments of one or more upcoming scenes within a program in accordance with the load-balancing rules responsive to one or more detections of one or more changes in one or more current bandwidths, the one or more adjustments comprising adjusting encoding of at least part of the content item by at least one encoder of the video handling system to encode at least the part of the content item with a second bit rate at least partially by causing encoding, by the at least one encoder, at least the part of the content item with an intra-program adjustment so that at least the part of the content item is encoded with the second bit rate; and causing transmitting, by a transmitter that is downstream from the at least one encoder, at least the part of the content item after the content item is encoded with the second bit rate.

2. The method of media content distribution for the multi-channel content distribution system of claim 1, the method further comprising:

calculating, by the video handling system, a bandwidth metric of at least one channel component of the set of one or more channel components for delivery of the media; and determining at least one encoding parameter is based at least in part on the at least one channel component.

3. The method of media content distribution for the multi-channel content distribution system of claim 2, wherein the at least one metric of the content item comprises a bit rate of the content item.

4. The method of media content distribution for the multi-channel content distribution system of claim 3, wherein the at least one metric of the content item further comprises a time scheduled for the content item.

5. The method of media content distribution for the multi-channel content distribution system of claim 4, wherein the viewership data is received from one or more data sources remote from the system, the viewership data indicative of one or more characteristics of viewers, and the one or more data sources remote from the video handling system comprise a set of television receivers.

6. The method of media content distribution for the multi-channel content distribution system of claim 5, further comprising compiling and analyzing viewing and recording statistics of the viewers.

7. The method of media content distribution for the multi-channel content distribution system of claim 6, wherein the set of one or more channel components corresponds to a set of one or more satellite transponders.

8. A system for multi-channel media content distribution, the system comprising:

a load-balancing encoding controller communicatively coupled to an encoding pool of encoders, the load-balancing encoding controller configured to perform:

receiving a content item, the content item comprising video data and corresponding to media for delivery to a plurality of television receivers via a set of one or more channel components;

detecting at least one metric of the content item as a function of time;

qualifying the content item based at least in part on viewership data, the qualifying to yield a qualification result for the content item, where the qualification result corresponds to a viewership score specified for a geolocation;

implementing load-balancing rules to take action based at least in part on the qualifying at least partially by:

ranking the content item with respect to a plurality of content items based at least in part on the viewership score specified for the geolocation;

based at least in part on the ranking, executing sampling logic to determine a first bit rate of the content item based at least in part on a size of the content item and/or estimating the first bit rate from one or more sample bit rates taken during transmission of at least a portion of the content item;

using the determined first bit rate to make one or more adjustments of one or more upcoming scenes within a program in accordance with the load-balancing rules responsive to one or more detections of one or more changes in one or more current bandwidths, the one or more adjustments comprising adjusting encoding of at least part of the content item by at least one encoder to encode at least the part of the content item with a second bit rate at least partially by causing encoding, by the at least one encoder, at least the part of the content item with an intra-program adjustment so that at least the part of the content item is encoded with the second bit rate; and causing transmitting, by a transmitter that is downstream from the at least one encoder, at least the part of the content item after the content item is encoded with the second bit rate.

9. The system for multi-channel media content distribution of claim 8, the load-balancing encoding controller further configured to perform:

calculating a bandwidth metric of at least one channel component of the set of one or more channel components for delivery of the media; and determining at least one encoding parameter is based at least in part on the at least one channel component.

10. The system for multi-channel media content distribution of claim 9, wherein the at least one metric of the content item comprises a bit rate of the content item.

11. The system for multi-channel media content distribution of claim 10, wherein the at least one metric of the content item further comprises a time scheduled for the content item.

12. The system for multi-channel media content distribution of claim 11, wherein the viewership data is received from one or more data sources remote from the system, the viewership data indicative of one or more characteristics of viewers, and the one or more data sources remote from the system comprise a set of television receivers.

13. The system for multi-channel media content distribution of claim 12, the load-balancing encoding controller further configured to perform compiling and analyzing viewing and recording statistics of the viewers.

14. The system for multi-channel media content distribution of claim 13, wherein the set of one or more channel components corresponds to a set of one or more satellite transponders.

15. One or more non-transitory, processor-readable media storing instructions that, when executed by one or more processing devices, cause the one or more processing devices to perform:

receiving a content item, the content item comprising video data and corresponding to media for delivery to a plurality of television receivers via a set of one or more channel components;

detecting at least one metric of the content item as a function of time;

qualifying the content item based at least in part on viewership data, the qualifying to yield a qualification result for the content item, where the qualification result corresponds to a viewership score specified for a geolocation;

implementing load-balancing rules to take action based at least in part on the qualifying at least partially by:

ranking the content item with respect to a plurality of content items based at least in part on the viewership score specified for the geolocation;

based at least in part on the ranking, executing sampling logic to determine a first bit rate of the content item based at least in part on a size of the content item and/or estimating the first bit rate from one or more sample bit rates taken during transmission of at least a portion of the content item;

using the determined first bit rate to make one or more adjustments of one or more upcoming scenes within a program in accordance with the load-balancing rules responsive to one or more detections of one or more changes in one or more current bandwidths, the one or more adjustments comprising adjusting encoding of at least part of the content item by at least one encoder to encode at least the part of the content item with a second bit rate at least partially by causing encoding, by the at least one encoder, at least the part of the content item with an intra-program adjustment so that at least the part of the content item is encoded with the second bit rate; and causing transmitting, by a transmitter that is downstream from the at least one encoder, at least the part of the content item after the content item is encoded with the second bit rate.

16. The one or more non-transitory, processor-readable media of claim 15, the instructions to further cause the one or more processing devices to perform:

calculating a bandwidth metric of at least one channel component of the set of one or more channel components for delivery of the media; and determining at least one encoding parameter is based at least in part on the at least one channel component.

17. The one or more non-transitory, processor-readable media of claim 16, wherein the at least one metric of the content item comprises a bit rate of the content item.

18. The one or more non-transitory, processor-readable media of claim 17, wherein the at least one metric of the content item further comprises a time scheduled for the content item.

19. The one or more non-transitory, processor-readable media of claim 18, wherein the viewership data is received from one or more data sources remote from the one or more processing devices, the viewership data indicative of one or more characteristics of viewers, and the one or more data sources comprise a set of television receivers.

20. The one or more non-transitory, processor-readable media of claim 19, the instructions to further cause the one or more processing devices to further perform compiling and analyzing viewing and recording statistics of the viewers.

* * * * *